United States Patent Office 3,421,984
Patented Jan. 14, 1969

3,421,984
PURIFICATION OF FLUIDS BY SELECTIVE
ADSORPTION OF AN IMPURE SIDE STREAM
FROM A DISTILLATION WITH ADSORBER
REGENERATION
William Paul Jensen, Springfield, and Stanley Lazerus,
Alexandria, Va., assignors to The Susquehanna Corporation, a corporation of Delaware
Filed May 2, 1967, Ser. No. 635,551
U.S. Cl. 203—41                            7 Claims
Int. Cl. B01d *3/00;* B01d *15/06*

ABSTRACT OF THE DISCLOSURE

Method and apparatus for reducing the amount of selected impurities present in the effluent issuing from a continuously operating distillation column by treating a side stream of fluid removed from the column by selective adsorption. A plurality of adsorbers are cycled on and off stream in a continuous process. Single or multiple adsorbers remove the selected contaminants and are removed from the stream and replaced by others when they are saturated. Removed adsorbers are purged and rejuvenated by exposure to various fluids to desorb the impurities, dry and cool the adsorbers, and then pressurize and prime them before they are in condition to be returned to onstream use.

BACKGROUND OF THE INVENTION

Field

Purification of fluids by means of distillation is a universally used process. Quite often, however, certain impurities which would be damaging in subsequent processing or use are present in the effluent issuing from the distillation tower. Removal of these selected impurities has been accomplished in processes separate from, and generally incompatible with, the distillation process. These systems generally do not lend themselves well to continuous processing, and are inefficient.

The method and means of the present invention are particularly valuable in the petroleum and petrochemical industries, where distillation processes are very sophisticated. In order to illustrate the invention and to provide a vehicle for displaying this advance in the art, it shall be described herein in combination with a distillation column for purifying butadiene, although it is to be understood that the teachings herein described are not to be considered as being limited to this one application.

Butadiene is the basic material for several kinds of synthetic rubber. Proper formulation of this synthetic rubber depends upon polymerization of the butadiene alone or as a copolymer with other monomers into linear chains. Control of the polymerization and the ability to obtain a high quality product is a function of the purity of the butadiene monomer. At the present time, purification of butadiene is accomplished chiefly by fractional distillation. It has been quite difficult on a commercial scale, however, to produce high quality butadiene without objectionable quantities of various acetylenes, especially vinyl acetylene. Many processes for reducing the acetylenic content of high purity butadiene have been proposed, but they are generally quite complex, often employing catalyzed reactions and requiring the handling of large volumes of materials. In many of the processes the butadiene losses are excessive. Another problem is that separate steps must be provided to remove each of the various $C_4$ acetylenes and this requirement obviously complicates the entire purification process.

Prior art

Although the prior art here again adverts to butadienes as an example, the techniques below-described apply generally to purification of other fluids.

In a typical case, the product discharged from a commercial butadiene distillation column consists of 99.7% butadiene, 0.25% butenes and other materials, and 300 to 500 parts per million of $C_4$ acetylenes. Polymerization of the butadiene is adversely affected more by the $C_4$ acetylenes, and in particular, vinyl acetylene, than by the other impurities. It is therefore desirable to reduce the amount of $C_4$ acetylenes to about 50 p.p.m. A typical prior art approach to the problem of purifying butadiene is found in U.S. Patent No. 3,070,641, "Butadiene Purification," issued Dec. 25, 1962, to Herndon et al. In a standard butadiene distillation column there is a continuous change in composition of both the liquid and the vapor phase, with the heaviest concentration of high molecular weight impurities tending to concentrate in the bottom while the distilled butadiene, along with gaseous impurities, concentrates in the upper portion. As is generally the case in the prior art, the process recited by the Herndon patent deals only with the removal of a single impurity, vinyl acetylene, from the butadiene. Herndon removes a side stream of gas from the column at a point where the gaseous concentration of vinyl acetylene is highest, and treats this side stream with a sodium dispersion to remove the vinyl acetylene. The treating reactor is any type equipped for continuous or intermittent liquid-liquid or gas-liquid contact, preferably a column or tower for continuous countercurrent flow of the gas and the sodium dispersion. The process of the Herndon patent will reduce the vinyl acetylenes in the final product to about 100 p.p.m. under good operating conditions, but has no effect on the other $C_4$ acetylenes. Aside from the fact that it treats only one of the objectionable elements present in the butadiene, the Herndon process treats the butadiene in the gaseous state and thus must treat a large volume.

Summary of the invention

The instant invention provides a means for continually reducing the amount of selected impurities present in the effluent of a distillation column. The invention is concerned with the treatment by selective adsorption of a side stream drawn off from the main distillation tower and the purging and rejuvenation of the adsorbers. As opposed to the prior art, the side stream is drawn off from the liquid zone of the distillation tower, thus offering the advantage of being able to treat much more impurity per unit volume. The selective adsorption is carried out on molecular sieves which have been prewetted, cooled, provided with a heat sink material, packed in tubes in a heat exchanger, or otherwise provided with a heat sink in order to maintain proper operating temperature. Advantage is taken of the fact that at a certain point in the distillation column the selected impurities are present in relatively high concentration and the concentration of other impurities is not excessive. The purity of the final product is a function of the concentration of the selected impurities in the distillation column feed, the concentration of the selected impurities at the point at which the side stream is drawn off, the degree of removal of the selected impurities by adsorption, and the rate of withdrawal. With a very high rate of withdrawal and recirculation, the quantity of selected impurities in the product stream could be reduced to zero. However, the economics of the overall operation, together with consideration of the amount of the selected impurities acceptable in the final product, actually dictate the amount to be withdrawn for treating. Equally important to the actual removal of the selected impurities is the method for continually purging and rejuvenating the adsorbers in order that the plant can operate continuously. This is accomplished by exposing the contaminated sieves to a succession of liquids and gases, as below described.

It is an object of this invention to provide an improved method and means for continually reducing the amount of selected impurities present in the effluent of a distillation column.

Another object of this invention is to provide a method and means for continually maintaining the amount of $C_4$ acetylenes present in the effluent of a butadiene distillation column at an acceptable level.

Still another object of this invention is to provide a method for purging and rejuvenating the adsorbers in a system for continually reducing the amount of selected impurities present in the effluent issuing from a distillation column.

THE DRAWINGS

DESCRIPTION

The adsorption apparatus

The system is described and illustrated in combination with a butadiene distillation column, but would apply equally well with distillation of other fluids.

Figure 1:
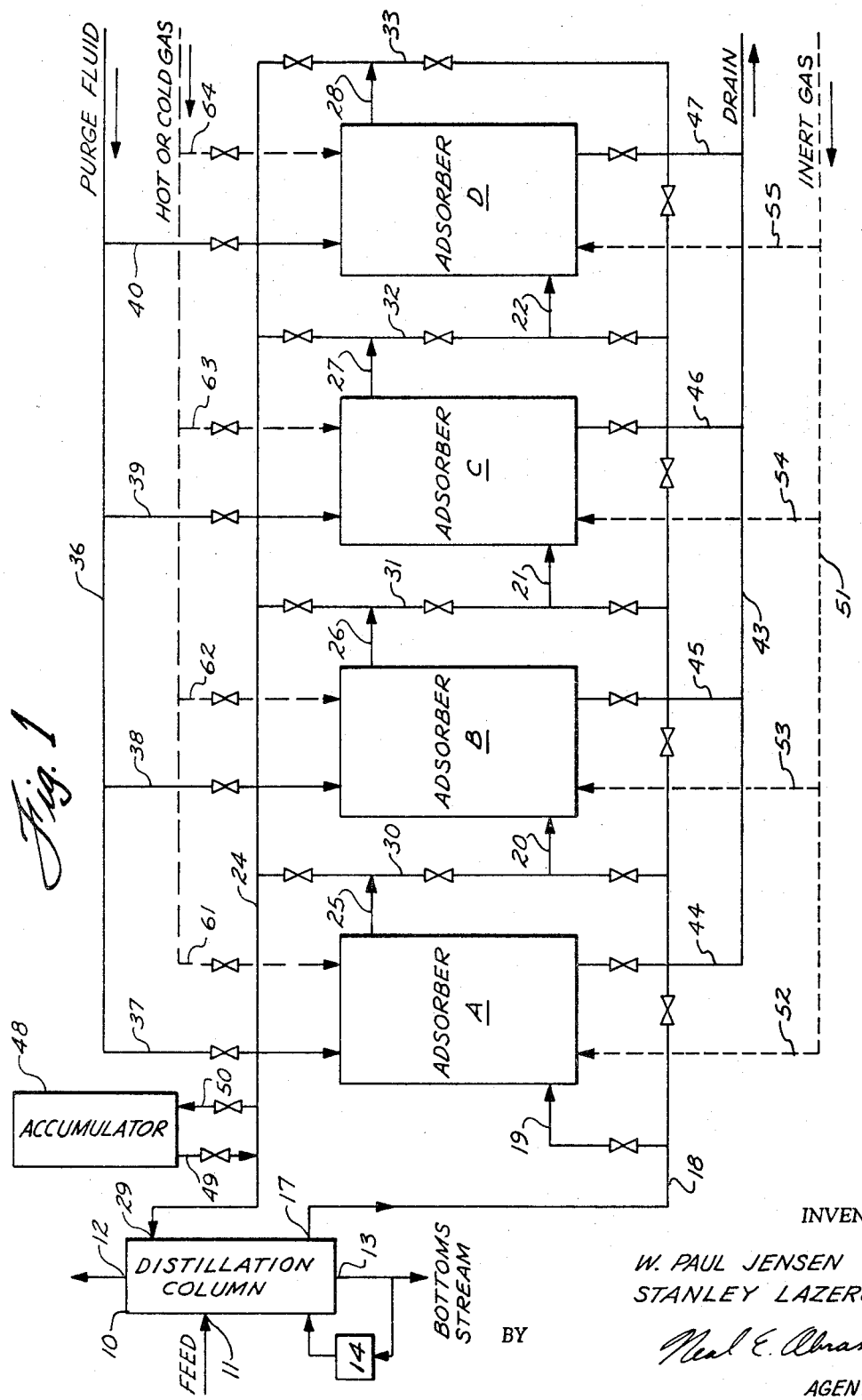
FIGURE 1 is a schematic diagram of the apparatus of the instant invention.

The purification system advanced by the instant invention consists of two basic parts, a system of adsorbers which removes the selected impurities from the fluid being distilled and, equally important, a system for purging and rejuvenating the adsorbers so that the process may be continuous. Shown in FIGURE 1 is a preferred arrangement of components. Distillation tower 10 is a conventional part of a standard purification system. Impure fluid is received by the tower at an input 11 and is discharged at outlet 12. The details of construction of distillation column 10 are well known in the art and form no part of the present invention. The distillation process carried out in tower 10 is continuous, with a continuous change in purity of both liquid and vapor. The high molecular weight impurities tend to concentrate in the bottom of the tower, purified fluid and certain gaseous impurities moving to the top of the tower. An extremely impure "bottoms" stream can be removed at 13 and recycled through a cleaner such as a de-oiler 14, or drained off. The instant invention is concerned with the treatment of a side stream of impure liquid, the removal point of which is selected so that the maximum amount of impurities can be removed by processing a minimum amount of liquid. The impure liquid is removed at a point 17 in the distillation column 10 and is then fed to a battery of adsorbers A, B, C and D, which will remove the selected impurities. The adsorbers are towers packed with a material, commonly known as molecular sieves, which will adsorb the selected impurity. These sieves must have a higher capacity for adsorbing the selected impurity than for other materials, including the fluid being treated. In a typical arrangement, as shown in FIGURE 1, the fluid flows through at least one adsorber while the others are being purged and rejuvenated. The operating techniques, characteristics, and a full explanation of the process follows after this description of the system.

Having been tapped from distillation column 10 at a point 17, the fluid feed passes to a feed header 18 which, by means of inlet lines 19, 20, 21, 22 is in communication with each of the adsorbers. Each adsorber is, in turn, connected to the product collection manifold 24 by means of outlet pipes 25, 26, 27 and 28. Collection manifold 24 redeposits the purified fluid back into the upper portion of distillation tower 10 at a point 29. The fluid feed can be passed through a single adsorber or a plurality of adsorbers arranged in series by means of a piping system including a plurality of connector pipes 30, 31, 32 and 33. Obviously, to accomplish the proper routing of the fluid feed to, from, and between the various adsorbers, a series of valves is necessary and these are also shown in FIGURE 1, although their operation is obvious and they are not labeled.

The purging and rejuvenating system

Of equal importance to the piping system for controlling the flow of fluid through the series of adsorbers are the systems to provide the elements necessary for purging and rejuvenating the adsorbent in the towers. Once an adsorber has been brought off the line because it has reached a predetermined level of contamination, it must be purged and rejuvenated. The first step in such rejuvenation is to depressurize and vent the tower to an appropriate collection unit, not shown. Then the adsorber is flooded with a material suitable to displace adsorbed fluid and impurities from the sieves. In the case of butadiene, water is one of several fluids which can be used for this purpose because it is preferentially adsorbed by the sieves and thus displaces the butadiene and acetylenic impurities. The purge material is supplied through a manifold 36 and associated individual supply conduits 37, 38 39 and 40. The displacing fluid is then desorbed by the introduction of hot high-pressure gas. In connection with the introduction of the various fluids to the adsorber a drain manifold 43 with drain tubes 44, 45, 46 and 47 is used to dispose of the vented gases and additives. Again, a complete valving system is necessary in order to make proper use of the piping systems described in this paragraph, and these valves are shown but not numbered. In order to maintain continuity of operation of this system, it is desirable to provide an accumulator as a reservoir for make-up feed. This accumulator 48 can be charged from the collection manifold with the discharge from the adsorbers and is connected into the feed system by conduits 49 and 50 in order to maintain constant flow into and out of the purification system.

In the course of the purge and rejuvenation of adsorbers A, B, C, and D, it is also necessary to inject at various times several gases including gas to maintain adsorber pressure, hot gas for blowing the water and any other gases from the adsorbers and drying the adsorption sieves, and cold gas to cool the adsorber before it goes back on the line. Inert gas for pressurization is injected by means of manifold 51 and pipes 52, 53, 54 and 55. Hot or cold gas is introduced into the system by means of a manifold 60 from a heating means or a cooling means, not shown. The gas is supplied from manifold 60 to the adsorbers by means of supply tubes 61, 62, 63 and 64, and is conducted from the adsorbers through drain manifold 43. Again, it is necessary to have a plurality of valves in the system but the operation within the procedures used is obvious and thus the valves are not numbered.

OPERATION

The system of this invention provides continuous purification over long periods of time by setting up a repeating cycle for each adsorber. A single adsorber is capable of purifying to the desired degree for a period of time, after which the level of selected impurities in its effluent rises above the acceptable level. At this point a second adsorber is brought on the line. The first tower, then contaminated, is removed from the stream, leaving the second standing in its place. As the effluent of the second adsorber approaches tolerance limits, a third is brought on and thus the cycle continues. Briefly stated then, the invention operates as follows: Impure fluid in the liquid state is taken from the distillation column 10 and is passed in series through one or more molecular sieve adsorption towers, from the last of which it is reinjected into the distillation tower, cleansed of the selected impurities. Since each adsorber has a limited on-line life, it must periodically be taken off the line to be purged and rejuvenated. To do this the adsorber is flushed to cleanse the sieves, subjected to hot gas for drying and desorption of water, and then cooled by a flow of cool gas. It is then ready to be placed back on the line.

To demonstrate the feasibility and operability of the system of the present invention, the following basic experiment was performed using butadiene as the liquid to be treated for removal of $C_4$ acetylenic impurities:

A two-tower series adsorption unit was constructed of three-inch diameter Schedule 40 pipe. Each tower was 7.5 feet long and was packed with 15 pounds of synthetic zeolite adsorption sieves (LMS, Type 13X). Butadiene feed containing 20,000 p.p.m. (2.0%) total acetylenic impurity was fed through the towers at a rate of 8.75 lb. per hour and the effluent was sampled for percent acetylenic impurity present. It was decided that the acceptable limit of acetylenic impurities would be 50 p.p.m. It was found that the effluent issuing from the towers contained less than 50 p.p.m. total acetylenic impurity for a period of four hours. The purging and rejuvenation procedure, including draining down, flooding, drying, cooling and priming, took ten hours. The cycle time for a single adsorption tower is thus 14 hours, four hours on the line and ten hours off.

Figure 2:
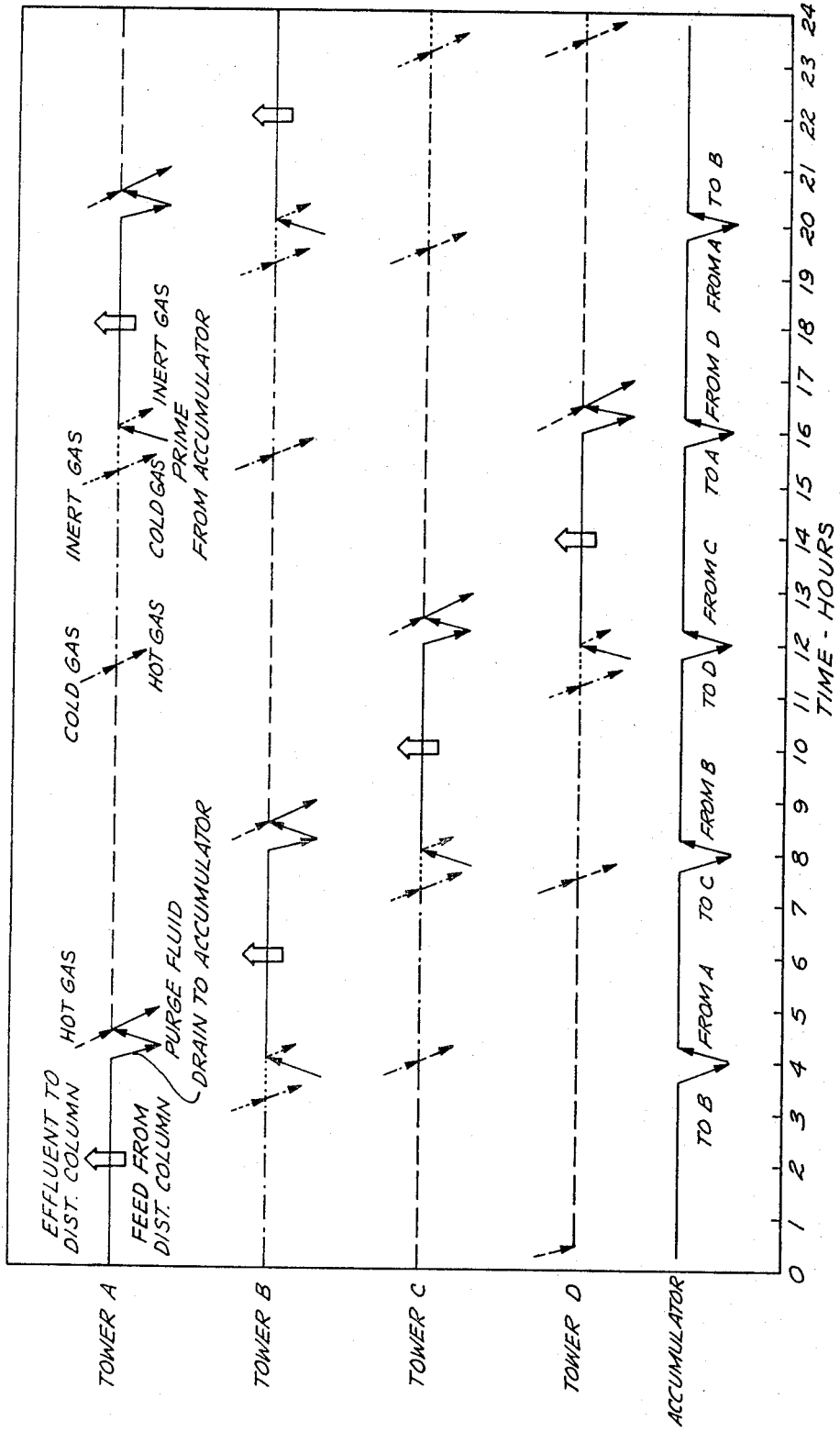
FIGURE 2 is a time chart of the system operating schedule with the adsorbers on a four-hour cycle.

The apparatus used in the experiment could easily be scaled up to plant size and, using the experimental figures as a basis, a number of overall system designs and operating procedures may be conceived. For example, since each tower has an on-line life of four hours followed by an off-time of ten hours, it would take three additional towers to maintain constant operation of the system. The operating schedule for such a system is shown in FIGURE 2. At the end of four hours, the on-line adsorber is immediately replaced by another adsorber which has been rejuvenated and primed. Priming can be accomplished in several ways, a preferred one of which is to store the contents drained from an adsorber coming off the line in an accumulator for later use in priming an adsorber which is about to be placed back on the line. The following is the sequence of events for a single tower in the system shown in FIGURE 2.

(1) Primed by butadiene fed from accumulator;

(2) Switched on-line for four hours, impure butadiene fed from distillation tower and purified effluent fed back thereto;

(3) Switched off the line and drained, butadiene being passed to accumulator;

(4) Flooded with water to displace adsorbed acetylenes and butadiene from the sieves;

(5) Water desorbed by introduction of hot gas to dry sieves and to remove adsorbed moisture;

(6) Hot gas displaced by cold gas to cool tower structure and sieves;

(7) Cold gas displaced by inert gas, such as nitrogen to pressurize adsorption tower prior to refilling; and (8) Primed by butadiene from accumulator and entire sequence begins again.

Figure 3:
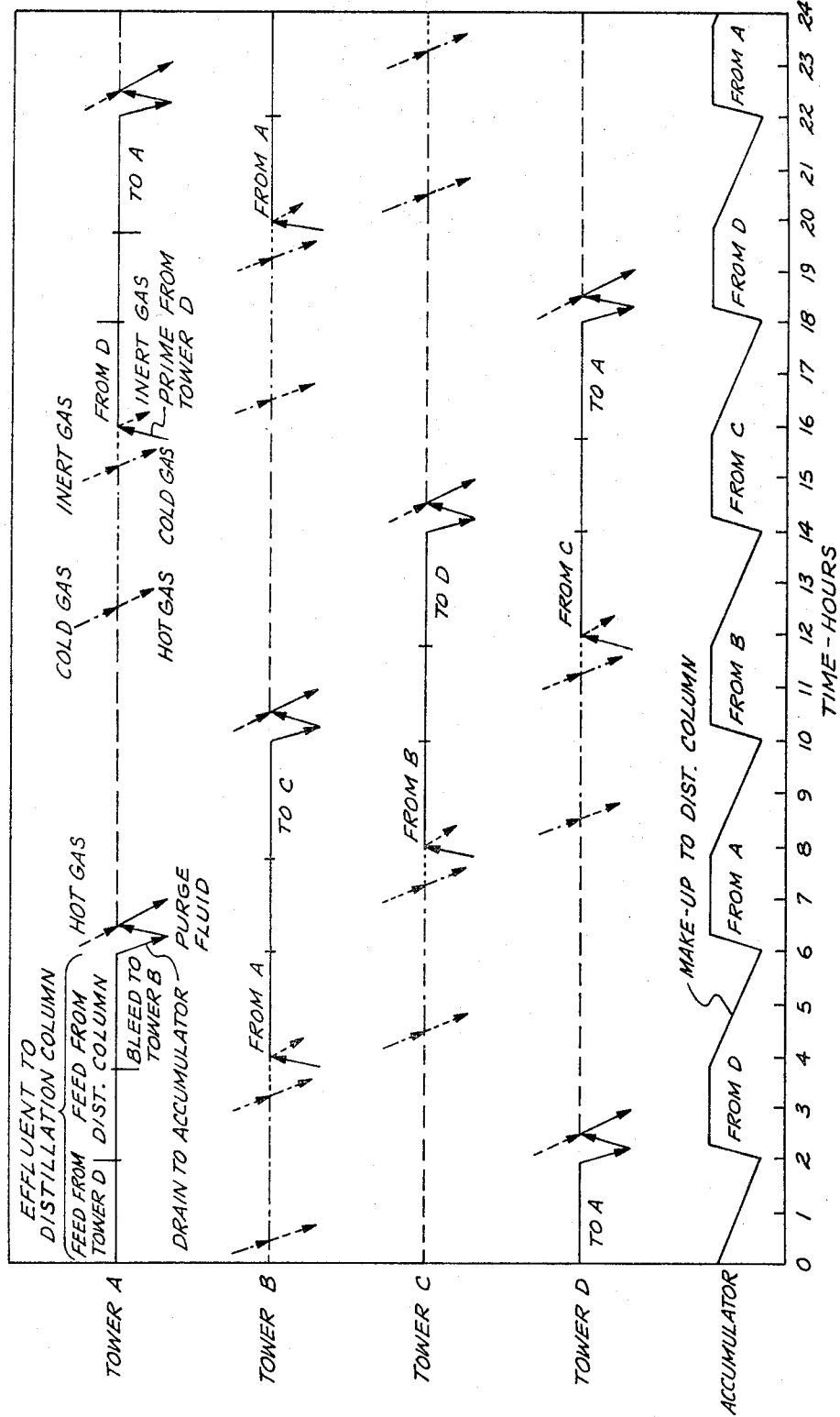
FIGURE 3 is a time chart of the system operating schedule with the adsorbers on a six-hour cycle.

The above is but one of many systems covered in this inventive concept. Adverting to FIGURE 3, a second application of the same principles is seen. In the system of FIGURE 3, each adsorption tower is on the line for six hours, instead of four hours as in the previously recited system. The major difference between this sequence and the four-hour sequence is that the second adsorber is primed with a portion of the effluent issuing from the first. As illustrated in FIGURE 3, the series of events for a single tower in this system is, in sequence;

(1) Primed by side stream of effluent from on-line adsorber;

(2) Brought on-line as second in series for two hours; intake is side stream of effluent of first adsorber, discharge is to distillation tower;

(3) Switched to become first in series as other adsorber, now contaminated, is taken off; effluent to distillation tower;

(4) After two hours, portion of effluent bled to another adsorber, which is brought on the line as second in series; make-up feed to distillation column from accumulator;

(5) Switched off the line and drained, butadiene drained being passed to accumulator;

(6) Flooded with water to displace adsorbed acetylenes and butadiene from the sieves;

(7) Water desorbed by introduction of hot gas to dry sieves;

(8) Hot gas displaced by cold gas to cool tower structure;

(9) Cold gas displaced by inert gas to pressurize adsorption tower prior to refilling; and

(10) Primed by effluent of on-line adsorber; cycle begins again.

As the selected impurity is adsorbed by the sieves, a large quantity of heat is generated. If this heat is not dissipated, it could adversely affect the fluid being treated causing, for example, polymerization on the surface of the sieves. In order to avoid this the sieves must be provided with a heat sink. This can be accomplished in several ways, method including packing the sieves in the tubes of a heat exchanger, providing means for conducting heat away to an external heat sink, precooling the sieves by exposure to such as liquid nitrogen, and/or precooling the process stream before its admission to the adsorber.

Heat is also generated during the purge and rejuvenation portion of the cycle of operation. As above stated, the contaminants are removed from the adsorbing sieves by placing the sieves in contact with a fluid which they adsorb preferentially. It is usually impossible to desorb every particle of adsorbed material from the sieves and, in the case of hydrocarbons, it is therefore probable that some hydrocarbon material will remain on the sieves. The next step is to desorb the purge fluid by means of a hot gas. If this hot gas contains a sufficient amount of oxygen, the hydrocarbons left on the sieves will oxidize, causing a substantial increase in temperature and possible damage. For example, in the butadiene treatment described throughout this paper, the sieves were dried by using heated nitrogen gas which contained about 1% oxygen. The subsequent oxidation produced temperatures in the area of 1000° F., high enough to cause internal damage to the adsorbers.

An obvious solution to the problem above presented is to so treat the inert drying gas so as to insure that no oxygen is present therein. However, the method of the instant invention makes use of this heat of oxidation by harnessing it to help desorb the purge fluid. A precise amount of oxygen is metered into the inert gas used, this amount being in response to the maintenance of a predetermined temperature within the adsorber. The oxidation of the remaining hydrocarbons is thus utilized to maintain the temperature level necessary for desorption, with the result that less hot gas is needed. This system has several advantages, the chief one being that the heat source is intimately emplaced in the sieves, and thus they are adsorbed and dried more quickly. Also, the heat of oxidation keeps the inert gas temperature high, increasing its efficiency. In actual use, the net result is that less hot gas need be supplied and thus a smaller heater can be used. Furthermore, the time necessary for desorbing is reduced.

A second task performed by the use of controlled catalytic oxidation on the adsorber sieves is that of cleaning the sieves of sludge formed thereon. During the adsorption cycle some butadiene is trapped by the sieves and is subsequently polymerized due to the heat generated by the adsorption process. The amount of polymerization which takes place during each cycle is enough to cause a sludge to build up on the sieves, reducing their efficiency. By causing controlled catalytic oxidation to take place in intimate relationship to the sieves, this sludge is burned away, thus completely cleaning the sieves during each rejuvenation cycle.

In the unlikely event that there is an insufficient amount of hydrocarbons remaining adsorbed on the sieves to support catalytic oxidation, such hydrocarbons can be provided by introducing a trace of a gas such as butane with the heated inert gas and oxygen. This would insure that the results recited in the preceding two paragraphs could be obtained.

Obviously, many modifications and variations of the invention are possible in the light of the above teachings. It is therefore to be understood that the invention may be practiced otherwise than as specifically described, within the scope of the appended claims.

What is claimed is:

1. A method of continuously reducing the amount of selected impurities present in the effluent issuing from a continuously operating distillation column comprising the steps of
   (a) removing from said distillation column a liquid side stream of the fluid being distilled at the point where the concentration of said selected impurities in said fluid being distilled is high,
   (b) passing said side stream through at least one of a plurality of adsorbers containing material which will preferentially adsorb said selected impurities over said fluid being purified,
   (c) injecting said side stream back into said distillation column after exposure to said adsorbers,
   (d) removing some of said adsorbers from the flow stream when the level of said impurities adsorbed exceeds a predetermined level and replacing said removed adsorbers with other of said adsorbers,
   (e) purging said removed adsorbers by exposure to a fluid which is adsorbed preferentially over said selected impurities and said fluid being distilled,
   (f) desorbing said fluid preferentially adsorbed from said removed adsorbers by introducing a heated gas mixture containing a percentage of oxygen in response to the maintenance of a predetermined temperature in said removed adsorbers to oxixdize at a controlled rate any hydrocarbons remaining in said removed adsorbers to enable said desorbing to be accomplished at least in part by the heat of said oxidation, and
   (g) cooling said removed adsorbers by displacing said heated gas mixture by introduction of a cold gas, whereby said selected impurities and said fluid being distilled are displaced from said removed adsorbers, rendering said removed adsorbers in condition to be placed back in said flow stream.

2. The method set forth in claim 1 further comprising the steps of
   (h) pressurizing said removed adsorbers by introduction of an inert gas, and
   (i) priming said removed adsorbers with said fluid being distilled.

3. A method of continuously reducing the amount of four-carbon-atom acetylenic compounds present in the effluent issuing from a continuously operating butadiene distillation column comprising the steps of
   (a) removing from said distillation column a liquid side stream of butadiene at a point where the concentration of said acetylenic compounds in said butadiene is high,
   (b) passing said side stream through at least one of a plurality of adsorbers containing material which will preferentially adsorb said acetylenic compounds over said butadiene,
   (c) injecting said side stream back into said distillation column after exposure to said adsorbers,
   (d) removing some of said adsorbers from the flow stream when the level of said acetylenic compounds adsorbed exceeds a predetermined level and replacing said removed adsorbers with other of said adsorbers,
   (e) purging said removed adsorbers by exposure to a fluid which is adsorbed preferentially over said acetylenic compounds in said butadiene,
   (f) desorbing said fluid preferentially adsorbed from said removed adsorbers by introducing a heated gas mixture containing a percentage of oxygen controlled in response to the maintenance of a predetermined temperature in said removed adsorbers to oxidize at a controlled rate any hydrocarbons remaining in said removed adsorbers whereby said desorbing is accomplished at least in part by the heat of said oxidation, and
   (g) cooling said removed adsorbers by displacing said heated gas mixture by introduction of a cold gas, whereby said acetylenic compounds and said butadiene are displaced from said removed adsorbers, rendering said removed adsorbers in condition to be placed back in said flow stream.

4. The method set forth in claim 3 further comprising the steps of
   (h) pressurizing said removed adsorbers by introduction of an inert gas, and
   (i) priming said removed adsorbers with butadiene.

5. A method for purging and rejuvenating adsorption material used to remove selected impurities from a flow stream, comprising the steps of:
   (a) purging said adsorption material by exposure to a fluid which is adsorbed preferentially over said impurities and said flow stream,
   (b) desorbing said fluid preferentially adsorbed by flushing said adsorption material with a heated gas mixture containing a percentage of oxygen in response to the maintenance of a predetermined temperature in said adsorption material to oxidize at a controlled rate any combustible material remaining on said adsorption material, whereby said desorbing is accomplished at least in part by the heat of said oxidation, and
   (c) cooling said adsorption material by flushing with a cold gas.

6. The method set forth in claim 5 wherein said heated gas mixture used for desorbing said fluid preferentially adsorbed further contains a percentage of combustible gases whereby oxidation on said adsorption material is assured.

7. A method of continuously reducing the amount of four-carbon-atom acetylenic compounds present in the effluent issuing from a continuously operating butadiene distillation column comprising the steps of
   (a) removing from said distillation column a liquid side stream of butadiene at a point where the concentration of said acetylenic compounds in said butadiene is high,
   (b) passing said side stream through at least one of a plurality of adsorbers containing material which will preferentially adsorb said acetylenic compounds over said butadiene,
   (c) injecting said side stream back into distillation column after exposure to said adsorbers,
   (d) removing some of said adsorbers from the flow stream when the level of said acetylenic compounds adsorbed exceeds a predetermined level and replacing said removed adsorbers with other of said adsorbers,
   (e) purging said removed adsorbers by exposure to a fluid which is adsorbed preferentially over said acetylenic compounds and said butadiene,
   (f) desorbing said fluid preferentially adsorbed from said removed adsorbers by introducing a heated gas mixture containing a percentage of combustible gases controlled in response to the maintenance of a predetermined temperature in said removed adsorbers to oxidize at a controlled rate in said removed adsorbers whereby said desorbing is accomplished at least in part by the heat of said oxidation, and
   (g) cooling said removed adsorbers by displacing said heated gas mixture by introduction of a cold gas, whereby said acetylenic compounds and said butadiene are displaced from said removed adsorbers, rendering said removed adsorbers in condition to be placed back in said flow stream.

References Cited

UNITED STATES PATENTS

| | | | |
|---|---|---|---|
| 2,137,605 | 11/1938 | Derr | 203—41 |
| 2,374,091 | 4/1945 | Garrison | 62—18 |
| 2,850,549 | 9/1958 | Ray | 260—676 |
| 2,996,558 | 8/1961 | Feldbauer | 260—676 |
| 3,122,486 | 2/1964 | Skarstrom | 203—41 |
| 3,132,079 | 5/1964 | Epperly et al. | 203—41 |
| 3,257,314 | 6/1966 | Kitchen | 210—30 |
| 3,342,891 | 9/1967 | Poons et al. | 260—681.5 |

WILBUR L. BASCOMB, JR., *Primary Examiner.*

U.S. Cl. X.R.

203—98, 99, 4; 260—676, 681.5; 55—179; 210—30; 62—18